US008171230B2

(12) United States Patent
Freimuth et al.

(10) Patent No.: US 8,171,230 B2
(45) Date of Patent: May 1, 2012

(54) PCI EXPRESS ADDRESS TRANSLATION SERVICES INVALIDATION SYNCHRONIZATION WITH TCE INVALIDATION

(75) Inventors: Douglas M. Freimuth, New York, NY (US); Renato J. Recio, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/949,078

(22) Filed: Dec. 3, 2007

(65) Prior Publication Data

US 2009/0144508 A1    Jun. 4, 2009

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. . 711/145; 711/118; 711/206; 711/E21.021; 711/E12.036

(58) Field of Classification Search .................. 711/118, 711/145, 206, E12.021, E12.036
See application file for complete search history.

(56) References Cited

U.S. PATENT DOCUMENTS

| 6,003,106 A * | 12/1999 | Fields et al. | 710/308 |
| 6,496,909 B1 * | 12/2002 | Schimmel | 711/163 |
| 6,785,759 B1 * | 8/2004 | Beukema et al. | 710/310 |
| 2004/0064668 A1 * | 4/2004 | Kjos et al. | 711/202 |
| 2005/0060614 A1 * | 3/2005 | Brooks | 714/28 |
| 2005/0091383 A1 * | 4/2005 | Bender et al. | 709/228 |
| 2006/0190685 A1 * | 8/2006 | Arndt et al. | 711/118 |
| 2006/0277351 A1 * | 12/2006 | Osanai et al. | 711/3 |

OTHER PUBLICATIONS

"The Price of Safety: Evaluating IOMMU Performance", by: Muli Ben-Yehuda, Jimi Xenidis, Michal Ostrowski, Karl Rister, Alexis Bruemmer, Leendert van Doorn, in OLS '07: The 2007 Ottawa Linux Symposium (Jul. 2007), pp. 9-20.*

* cited by examiner

*Primary Examiner* — Michael Alsip
(74) *Attorney, Agent, or Firm* — Matthew B. Talpis; Jack V. Musgrove

(57) ABSTRACT

A PCI Express (PCIe) computer system utilizes address translation services to translate virtual addresses from I/O device adaptors to physical addresses of system memory. A combined memory controller and host bridge uses a translation agent to convert the I/O addresses via translation control entries (TCEs) in a TCE table (also known as an address translation and protection table). Some of the I/O device adaptors have address translation caches for local storage of TCEs. The TCE definition includes a new non-cacheable control bit which is set active in the TCE table when the TCE is in the process of being invalidated. The memory controller prevents further caching of the TCE while the non-cacheable control bit is active. A further implementation utilizes a change-in-progress control bit of the TCE to indicate that the TCE is in the process of being changed to allow simultaneous invalidation of the previously TCE information.

19 Claims, 4 Drawing Sheets

PCI EXPRESS ADDRESS TRANSLATION SERVICES INVALIDATION SYNCHRONIZATION WITH TCE INVALIDATION

BACKGROUND OF THE INVENTION

1. Field of the Invention

The present invention generally relates to computer systems, and more particularly to a method and apparatus for memory access by an input/output (I/O) device of a computer system which uses translation control entries (TCEs) in system memory and copies of the TCEs stored in a local cache of the I/O device.

2. Description of the Related Art

A typical structure for a conventional computer system includes one or more processing units connected to a system memory device (random access memory or RAM) and to various peripheral, or input/output (I/O) devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct memory-access channels. A computer system may have many additional components, such as serial, parallel or universal serial bus (USB) ports for connection to, e.g., printers, and network adapters. Other components might further be used in conjunction with the foregoing; for example, a display adapter might be used to control a video display monitor, a memory controller can be used to access the system memory, etc.

Several different bus designs have been developed for interconnecting the various computer components. The original personal computer (PC) introduced by International Business Machines Corp. used an "expansion" bus referred to as the XT bus, which allowed a user to add various optional devices, such as additional memory (RAM), sound cards, telephone modems, etc. This early design was improved upon by adding more data and address lines, new interrupt lines, and direct memory-access (DMA) control lines, to create the AT bus, which is also referred to as the Industry Standard Architecture (ISA) bus. The AT design allowed the microprocessor to run at a faster speed than the expansion bus. A 32-bit extension to this bus was later created, which is referred to as the Extended Industry Standard Architecture (EISA).

In addition to the foregoing designs, several other bus designs have been developed allowing the use of a system bus which interconnects the processors and system memory devices, along with a separate bus which interconnects the peripheral devices to the system bus (using a bus bridge). Two well-known standards are the Video Electronics Standards Association (VL) bus, and the Peripheral Component Interconnect (PCI) bus. The PCI specification allows multiple PCI-compliant expansion cards to be installed in slots constructed along the PCI bus. A PCI local bus system uses a PCI controller. A PCI controller can exchange data with the microprocessor 64 bits at a time, and allows "intelligent" PCI-compliant adapters to perform tasks concurrently with the microprocessor, using a technique called bus mastering. The PCI specification also allows for multiplexing, a technique that permits more than one electrical signal to be present on the bus at one time.

An extension to the PCI specification referred to as PCI Express (or PCIe) has been created which provides PCI compatibility using established PCI programming models and further allows new hardware to take advantage of enhanced features. The PCIe architecture provides a low-pin count interface and support for multiple interconnect widths, new hot-plug cards, and higher transfer rates. There are also supplemental specifications to the PCIe architecture for delivery of increased performance capabilities which consider issues such as power consumption and heat management.

One enhancement made available with PCIe systems is address translation services (ATS). The computer system uses a translation agent to translate addresses from a virtual address provided by the I/O device to a physical address in system memory. A PCIe endpoint (I/O device) may cache an address translation entry from the system-level address translation and protection table (ATPT) that resides in memory. An ATPT entry is also referred to as a translation control entry (TCE). Caching of a TCE allows an endpoint to request a DMA transfer using an address that it pre-translates, so the TCE does not have to be fetched from memory in series with the DMA operation, and hence reduces the latency of the operation.

When the memory system deems that the translation in a system TCE is no longer desired or needs to be changed, the TCE is invalidated. At that point, the cached entry in the PCIe address translation cache (ATC) must be invalidated as well. The ATS specification provides protocols on the PCIe links to carry out this invalidation; however, there is a latency in carrying out the invalidation of the TCE, i.e., from the time the system decides to invalidate the entry until the entry is actually invalidated, and the ATS specification does not provide any guidance on how the system is supposed to handle this latency. Software and hardware in the PCIe system require certain latencies to be associated with the TCE invalidation process, but ATS introduces new and indeterminate invalidation latencies. It can accordingly be difficult to ascertain when the system can reuse a TCE that is being invalidated from another process. It is also important to be able to prevent further caching of the TCE by an endpoint while the invalidation process is taking place. It would, therefore, be desirable to devise an improved method for TCE invalidation that could synchronize the system level and the I/O device. Since the delay between system memory and the I/O device can be lengthy, it would be further advantageous if the method could accommodate the asynchronous nature of the invalidation operation.

SUMMARY OF THE INVENTION

It is therefore one object of the present invention to provide a method of invalidating translation control entries which are cached in one or more I/O devices and are used by a memory system to access physical memory addresses in response to requests from the I/O devices.

It is another object of the present invention to provide such a method which prevents further caching of the TCE by an endpoint while the invalidation process is taking place.

It is yet another object of the present invention to provide such a method which may allow for a change to be made to a TCE simultaneously with the invalidation of the previously-cached TCE.

The foregoing objects are achieved in a method of synchronizing the invalidation of a TCE by activating a non-cacheable control bit of the TCE in a TCE table of system memory to indicate that the TCE is in the process of being invalidated, thereafter invalidating any copies of the TCE stored in address translation caches of the I/O device adaptors, and then deactivating the non-cacheable control bit of the TCE in the TCE table. The memory controller prevents further caching of the TCE while the non-cacheable control bit is active. A copy of the TCE may be stored in an address translation cache of a memory controller, and this copy is also invalidated. The copy of the TCE stored in the address translation cache of the memory controller may be invalidated by setting a corresponding bit in an invalidation register. In the illustrative embodiment the memory controller tracks which of the I/O device adaptors has a cache copy of the TCE, issues a message to each of these I/O device adaptors requesting invalidation of the TCE, and receives confirmation responsive to the message that each of these I/O device adaptors has invalidated its cache copy of the TCE. A further implementation utilizes a change-in-progress control bit of the TCE to indicate that the TCE is in the process of being changed, to allow simultaneous changing and invalidation of the previously TCE information.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
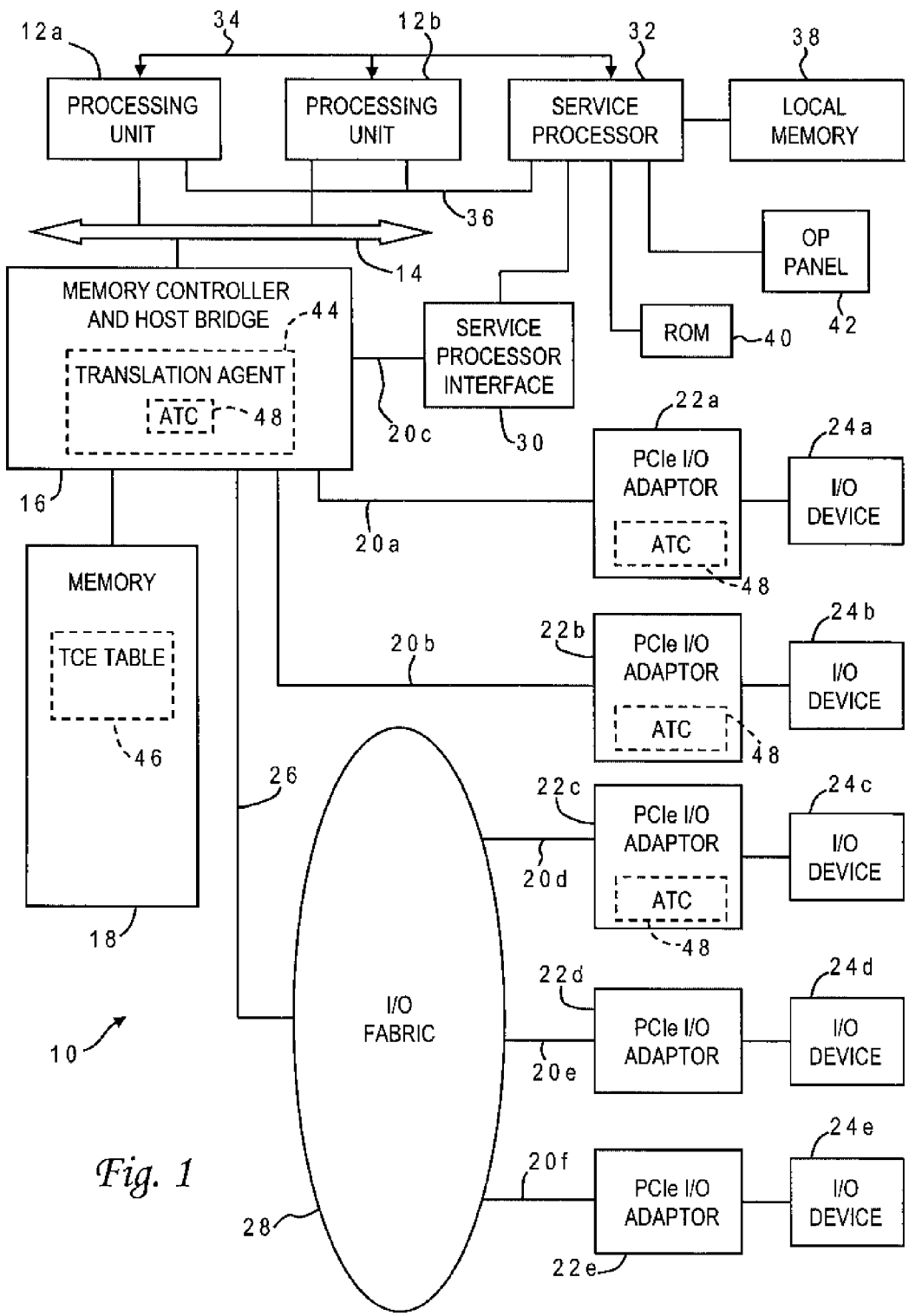
FIG. 1 is a block diagram of one embodiment of a computer system constructed in accordance with the present invention which uses translation control entries to translate virtual addresses used by input/output devices into physical addresses of system memory.

With reference now to the figures, and in particular with reference to FIG. 1, there is depicted one embodiment 10 of a computer system constructed in accordance with the present invention. Computer system 10 is a symmetric multiprocessor system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20c, 20d, 20e. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between a service processor 32 and the I/O subsystem through MC/HB 16. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications. While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

In the exemplary embodiment computer system 10 runs as a logically-partitioned data processing system with multiple heterogeneous operating systems (or multiple copies of a single operating system) running simultaneously. Each of these multiple operating systems may have any number of software programs executing within it. Computer system 10 is logically partitioned using a hypervisor which virtualizes hardware by assigning different PCI devices, or address spaces thereof, to different logical partitions. For example, a graphics adapter providing a connection to a display device might operate in one logical partition, while a hard drive controller providing a connection to a hard disk might operate in a different logical partition. Each operating system executing within computer system 10 may access only those I/O address spaces that are within its logical partition.

The hypervisor, which may be implemented in hardware or software (stored in memory 18), is used to set up the mapping translations for PCIe address translation services (ATS). MC/HB 16 contains a translation agent 44 which takes the I/O address coming from a PCIe link and converts it to a different (physical) address via a translation control entry (TCE) in a TCE table 46. The TCE table is also known as an address translation and protection table (ATPT). The hypervisor controls the TCE table content. In this embodiment TCE table 46 resides in memory 18, but part or all of its contents may be stored in address translation caches (ATCs) 48 in the I/O adapters and optionally with translation agent 44. Older (legacy) adaptors 22d, 22e, may not provide for TCE caching.

Caching of the physical address closer to the user of the TCE helps in performance of direct memory access (DMA) operations from the I/O adapters, but caching also requires protocols to ensure that the cached copies stay in synchronization with each other (coherency). One protocol for synchronizing between translation agent 44 and ATCs 48 is defined by the ATS specifications as an extension to the PCIe standard. The ATS protocol provides that an Invalidate Request Message be sent from the translation agent to any caching I/O adapter to request the I/O adapter invalidate a currently cached TCE, and an Invalidate Complete Message which allows the I/O adapter to inform the translation agent that the previous invalidation request has been completed. This request and completion interchange advantageously allows for asynchronous operations, but also adds indeterminate delay to the invalidation process. This asynchronous delay can be problematic for existing system implementations that expect invalidations to occur as soon as a request to invalidate is acknowledged.

Figure 2:
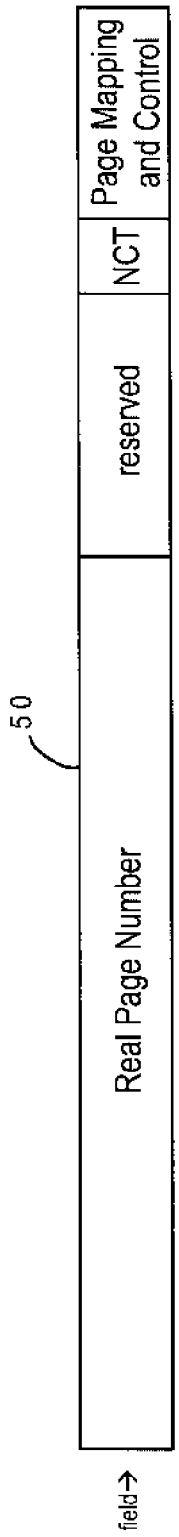
FIG. 2 is a pictorial representation of the bits in a translation control entry in accordance with one implementation of the present invention.

The present invention provides a mechanism to secure the invalidation process using an additional control bit in the TCE. This bit, referred to herein as the non-cacheable TCE (NCT) bit, tells the translation agent whether to honor an ATS request to retrieve the translation information. If the NCT bit is set, the translation agent refuses such requests. The NCT bit is used in conjunction with TCE read-only and write-only bits to alleviate the problems arising from asynchronous invalidation operations. One definition for a TCE according to the illustrative implementation of the present invention is shown in FIG. 2. This bit definition is Big Endian and has four bit fields. Bits 0 to 51 correspond to the real page number of the requested memory block in system memory space; bits 52 to 60 are reserved for future use; bit 61 is the NCT bit; and bits 62 and 63 are the page mapping and control (read-only/write-only) bits. The real page number field constitutes the bits that replace corresponding page number bits in the virtual I/O address, and therefore is the address translation component of TCE 50. In certain host bridge implementations all of these real page number bits may not be required, but enough bits should be employed to match the largest real address in the system platform. The page mapping and control bits define page mapping and read-write authority. They are coded as follows: 00—page fault (no access authority); 01—system address space (read only); 10—system address space (write only); 11—system address space (read/write). For accesses to system address space with an invalid operation (write to a read-only page or read to a write-only page), the host bridge will generate an error.

Systems which do not implement PCIe ATS but which implement some other form of address translation can similarly use the real page number and either a valid bit, or read-only and write-only bits, the latter allowing for greater granularity of validation of operations.

Figure 3:
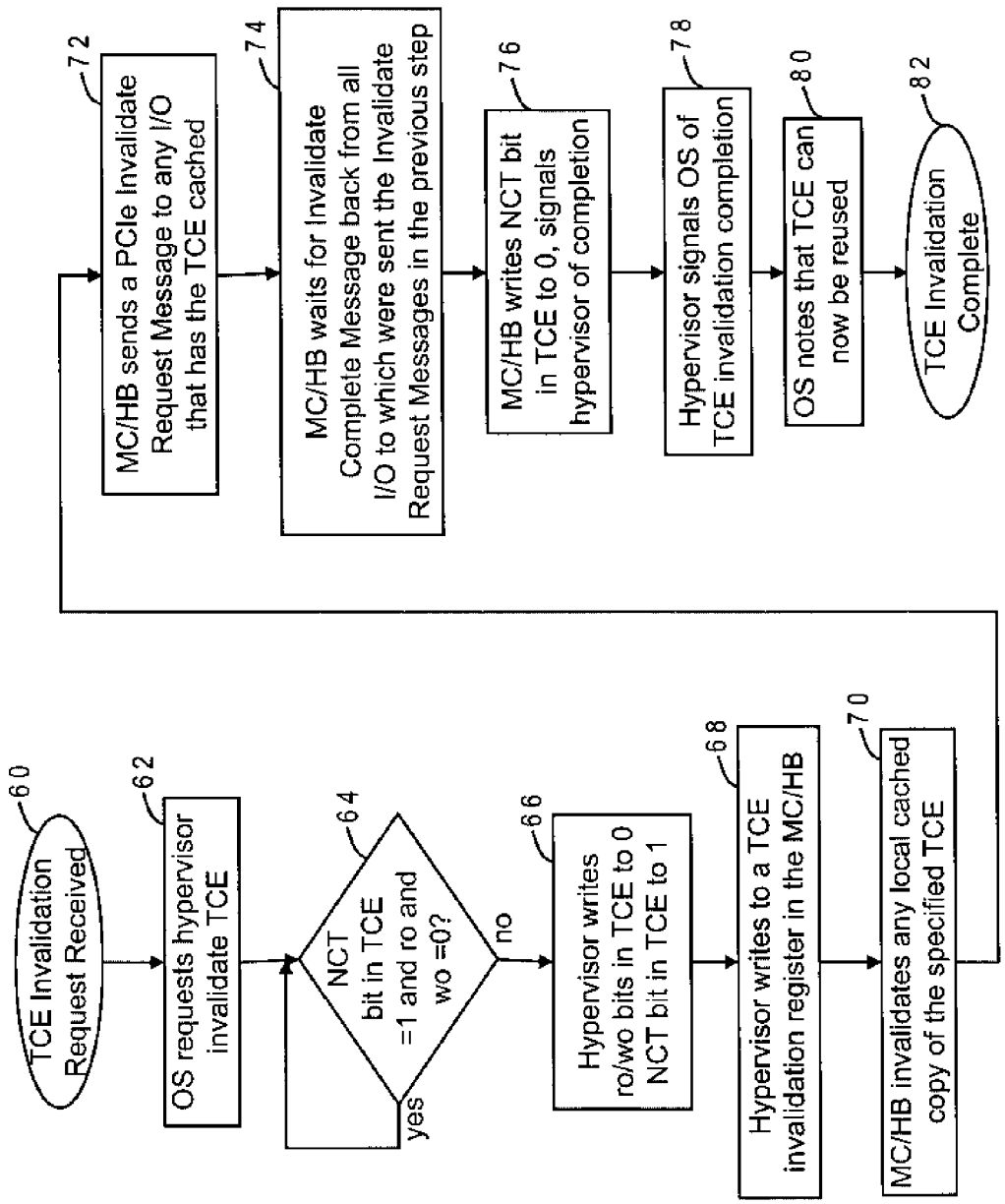
FIG. 3 is a flow chart illustrating TCE invalidation in accordance with one implementation of the present invention.

The present invention may be further understood with reference to the chart of FIG. 3 which illustrates the logical flow for one method of TCE invalidation. The process starts with a determination by the OS that a particular TCE needs to be invalidated for example due to the completion of an I/O operation (60), and the OS requests the hypervisor to invalidate the TCE (62). In some cases or for some systems it may be possible or necessary for the hypervisor to perform the invalidation process without any involvement by or knowledge of the OS. If there currently is an unfinished invalidate operation against the selected TCE, as indicated by the NCT bit in the TCE being a "1" with the page mapping and controls bits both being a "0", then the new invalidation request against the same TCE must wait until the previous operation is complete (64). The hypervisor then writes to the TCE in the TCE table in system memory, setting the read-only bit and the write-only bit both to "0", thereby indicating that the TCE is invalid. In addition, the hypervisor sets the NCT bit in the TCE to a "1". Alternatively, the NCT bit can be set to "1" with either or both of the page mapping and control bits being set to a "1", and the TCE is considered valid but it cannot be cached in an I/O adapter ATC. In this case the NCT bit not only acts as a cache-inhibit bit to prevent caching but further signifies (with a page mapping and control bit set to "0") that the asynchronous invalidation process is not yet complete.

The hypervisor next writes to an invalidation register in the MC/HB (in the translation agent) to specify which TCE is to be invalidated (68). Any active bit in the invalidation register indicates that the corresponding TCE is invalid. The MC/HB tracks which I/O adapters have cached a given TCE. The MC/HB invalidates any local copy of the TCE in its cache (70), and sends a PCIe Invalidate Request Message to any I/O adapter 22 which has the specific TCE cached (72). The I/O adapters then invalidate their cached copies, and the MC/HB waits for the Invalidate Complete Message to be received from all I/O adaptors which were sent Invalidate Request Messages (74). Once all of the Invalidate Complete Messages have been received, i.e., there are no outstanding cached copies of the TCE remaining, the MC/HB changes the NCT bit in the TCE in the TCE table to a "0" and, if the system requires it, signals an interrupt to the hypervisor to inform the hypervisor that the cached copies of the TCEs have been invalidated (76). No further caching for this TCE will occur until the TCE in the TCE table is changed to be valid once more, that is when the read-only bit or write-only bit are "1" and the NCT bit is a "0". The hypervisor then signals the OS that the TCE invalidation request has completed (78) so the OS can reuse the TCE (80), and TCE invalidation is complete (82).

Figure 4:
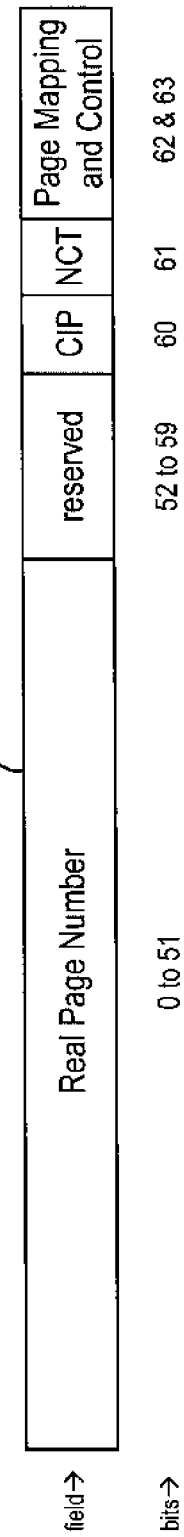
FIG. 4 is a pictorial representation of the bits in a translation control entry in accordance with another implementation of the present invention.

The present invention contemplates not only asynchronous invalidation operations but also simultaneous changing of the value of a TCE. A second control bit is used for this purpose, referred to herein as the change-in-progress (CIP) bit. Another definition for a TCE 50' according to this alternative implementation is shown in FIG. 4. This bit definition is again Big Endian and has five bit fields. The fields are essentially the same as for the NCT bit only implementation of FIG. 2 except that the previously reserved bit 60 is now the CIP bit.

Figure 5:
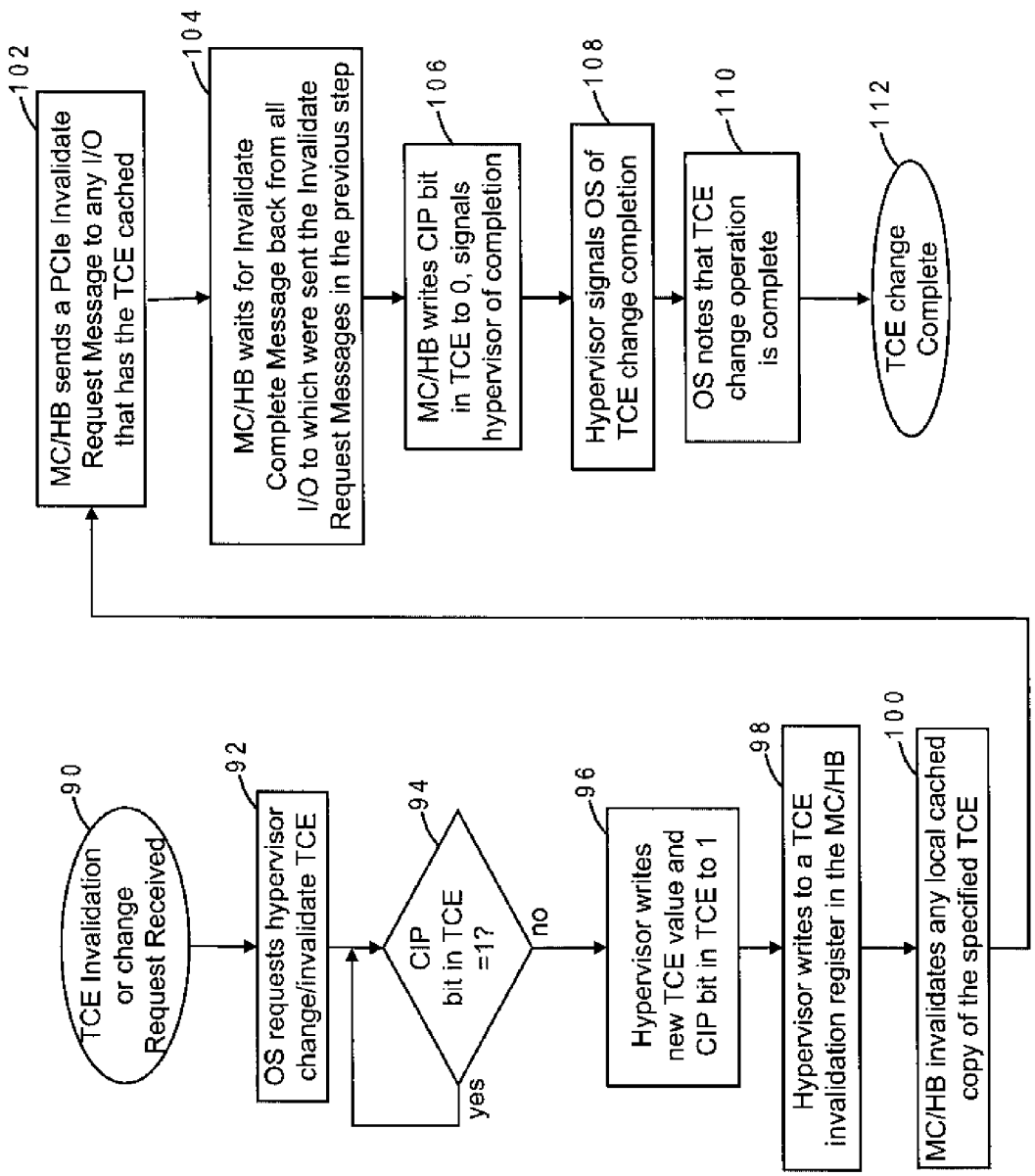
FIG. 5 is a flow chart illustrating a change made to a TCE concurrently with the invalidation of the previously cached TCE in accordance with another implementation of the present invention.

FIG. 5 shows the invalidation flow for the case where the CIP bit is implemented in the TCE. The process starts with the determination by the OS that a TCE needs to be changed or invalidated (90), and the OS requests the hypervisor to change or invalidate the TCE (92). It may again be possible or necessary for the hypervisor to perform the change process without any involved by or knowledge of the OS. If there is an unfinished operation against the selected TCE, as indicated by the CIP bit in the TCE being a "1", the new request against the same TCE has to wait until the previous operation is complete (94). The hypervisor then writes the new TCE value (real page number) to the TCE in the TCE table in system memory, setting the read-only bit and the write-only bit to the value provided if the TCE is to be changed instead of invalidated, or setting both to "0" to indicate that the TCE is invalid (96). In addition, the hypervisor sets the NCT bit in the TCE appropriately as specified by the request. The NCT bit may be set to "1" to indicate a TCE that should not be cached in the I/O adapter ATC. In the same step 96 the hypervisor sets the CIP bit to a 1, indicating a change is in progress for the TCE. When the CIP bit is set the translation agent will prevent caching of the TCE and will not provide the translation for any ATS request by the I/O adapters, regardless of the setting of the NCT bit.

The hypervisor next writes to the invalidation register in the MC/HB to specify which TCE is to be invalidated (98), even if this operation is a change to the TCE. For the change operation, once the invalidation process is complete the CIP bit in the TCE will be reset to a "0" and any further requests from an I/O adapter will retrieve the new, changed version of the TCE. The MC/HB then invalidates any local copy of the TCE in its cache (100), and sends a PCIe Invalidate Request Message to any I/O adapter which has the specific TCE cached (102). The MC/HB waits for the Invalidate Complete Message to be received from all I/O adaptors which were sent Invalidate Request Messages (104). Once all of the Invalidate Complete Messages have been received, i.e., there are no outstanding cached copies of the TCE remaining, the MC/HB changes the CIP bit in the TCE in the TCE table in system memory to a "0" and, if the system requires it, signals an interrupt to the hypervisor to inform the hypervisor that the cached copies of the TCEs have been invalidated (106). No further caching for this TCE will occur until the TCE in the TCE table is valid once more, that is when the read-only bit or write-only bit are "1", the NCT bit is a "0", and the CIP bit is a "0". The hypervisor then signals the OS that the TCE change request has completed (108) so the OS can reuse the TCE (110), and the TCE change is complete (112).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been disclosed in the preferred context of a PCIe system, it is nevertheless usable in non-PCIe compliant systems which still rely on caching of translated I/O adapter addresses. It is therefore contemplated that such modifications can be made without departing from the spirit or scope of the present invention as defined in the appended claims.

What is claimed is:

1. A method of changing a translation control entry (TCE) used by one or more input/output (I/O) device adaptors of a computer system to address system memory, comprising:
   receiving a request to change a selected one of a plurality of TCEs in a TCE table of the system memory, wherein each TCE in the TCE table has a respective change-in-progress control bit and each TCE in the TCE table has a respective non-cacheable control bit to indicate when caching of a corresponding TCE is to be prevented during TCE invalidation;
   writing a new TCE value to the selected TCE in the TCE table of the system memory;
   activating the change-in-progress control bit of the selected TCE in the TCE table of the system memory;
   refusing address translation services requests to retrieve translation information from the selected TCE while its change-in-progress control bit is in an active state regardless of the state of its non-cacheable control bit;
   after said writing and said activating, invalidating any copies of the selected TCE stored in address translation caches of the I/O device adaptors; and
   after said invalidating, deactivating the change-in-progress control bit of the selected TCE in the TCE table.

2. The method of claim 1, further comprising:
   invalidating a copy of the selected TCE stored in an address translation cache of a memory controller for the system memory.

3. The method of claim 2 wherein the memory controller prevents further caching of the selected TCE while the change-in-progress control bit is active.

4. The method of claim 2 wherein the copy of the selected TCE stored in the address translation cache of the memory controller is invalidated by setting a corresponding bit in an invalidation register of the memory controller.

5. The method of claim 1 wherein said invalidating includes:
   tracking which of the I/O device adaptors have a cache copy of the selected TCE;
   issuing a message from the memory controller to each of the I/O device adaptors which have a cache copy of the selected TCE requesting invalidation of the selected TCE; and
   receiving confirmation responsive to the message that each of the I/O device adaptors which have a cache copy of the selected TCE has invalidated its cache copy of the selected TCE.

6. The method of claim 1 further comprising setting read-only/write-only control bits of the selected TCE in the TCE table to indicate a read/write access specified by a change request.

7. A memory system comprising:
   a system memory device having a translation control entry (TCE) table stored therein, the TCE table having a plurality of TCEs used by input/output (I/O) device adaptors to address said system memory device, wherein each TCE in the TCE table has a respective non-cacheable control bit and each TCE in the TCE table has a respective change-in-progress control bit; and
   a memory controller for said system memory device having a translation agent which converts addresses from the I/O device adaptors to physical addresses of said system memory device using the TCEs in the TCE table, wherein the translation agent refuses address translation services requests to retrieve translation information from any TCE whose non-cacheable control bit is in an active state, and the translation agent refuses address translation services requests to retrieve translation information from any TCE whose change-in-progress control bit is in an active state regardless of the state of its non-cacheable control bit.

8. The memory system of claim 7 wherein said memory controller includes an address translation cache for storing TCEs.

9. The memory system of claim 7 wherein said memory controller prevents further caching of any TCE whose non-cacheable control bit is active.

10. The memory system of claim 7 wherein said memory controller tracks which of the I/O device adaptors have a cache copy of a given TCE, issues a message to each of those I/O device adaptors requesting invalidation of the given TCE, and receives confirmation responsive to the message that each of those I/O device adaptors has invalidated its cache copy of the given TCE.

11. The memory system of claim 7, further comprising a host bridge combined with said memory controller which provides an interface to communications links respectively connected to the I/O device adaptors.

12. The memory system of claim 11, further comprising a switch for interconnecting said host bridge with at least one additional communications link which is connected to another I/O device adaptor.

13. A computer system comprising:
   at least one host processor which process program instructions;
   a system bus connected to said host processor;
   a plurality of input/output (I/O) devices;
   a plurality of I/O adaptors respectively connected to said I/O devices;
   a plurality of communications links for said I/O adaptors;
   a host bridge which provides an interface between said system bus and said communications links;
   a system memory device having a translation control entry (TCE) table stored therein, the TCE table having a plurality of TCEs used by said I/O adaptors to address said system memory device, wherein each TCE in the TCE table has a non-cacheable control bit, each TCE in the TCE table has a change-in-progress control bit, and at least one of said I/O adaptors stores TCEs in an address translation cache; and
   a memory controller for said system memory device having a translation agent which converts addresses from said I/O adaptors to physical addresses of said system memory device using the TCEs in the TCE table, wherein the translation agent refuses address translation services requests to retrieve translation information from any TCE whose non-cacheable control bit is in an active state, and the translation agent refuses address translation services requests to retrieve translation information from any TCE whose change-in-progress control bit is in an active state regardless of the state of its non-cacheable control bit.

14. The computer system of claim 13 wherein said memory controller includes an address translation cache for storing TCEs.

15. The computer system of claim 13 wherein said memory controller prevents further caching of any TCE whose non-cacheable control bit is active.

16. The computer system of claim 13, further comprising:
   a service processor;
   a first interface between said service processor and said host processor; and
   a second interface between said service processor and one of said communications links.

17. The computer system of claim 13, further comprising a switch for interconnecting said host bridge with at least one additional communications link which is connected to another I/O device adaptor.

18. In a computer system having a plurality of input/output devices which store cached copies of a translation control entry (TCE) from a TCE table of system memory having a translation control agent, the improvement comprising:
   a non-cacheable control bit for each TCE in the TCE table, wherein an active state of said non-cacheable control bit prevents further caching of the TCE and indicates that the TCE is in the process of being invalidated; and
   a change-in-progress control bit for each TCE in the TCE table, wherein the translation agent refuses address translation services requests to retrieve translation information from any TCE whose change-in-progress control bit is in an active state regardless of the state of its non-cacheable control bit.

19. In the computer system of claim 18, the improvement further comprising:
   a change-in-progress control bit for each TCE in the TCE table, wherein an active state of said change-in-progress control bit also prevents further caching of the TCE and indicates that the TCE is in the process of being changed.

* * * * *